United States Patent [19]

Palmer

[11] Patent Number: 4,542,009
[45] Date of Patent: Sep. 17, 1985

[54] SYNTHESIS OF INTERCALATABLE LAYERED STABLE TRANSITION METAL CHALCOGENIDES AND ALKALI METAL-TRANSITION METAL CHALCOGENIDES

[75] Inventor: David N. Palmer, Tolland, Conn.

[73] Assignee: Combustion Engineering, Inc., Windsor, Conn.

[21] Appl. No.: 487,158

[22] Filed: Apr. 21, 1983

[51] Int. Cl.$^4$ .............. C01B 19/04; B05D 3/06; H01L 7/36; C23C 11/00
[52] U.S. Cl. .................. 423/561 R; 423/509; 423/565; 204/192 N; 427/38; 429/218; 148/189; 148/175; 148/6.3
[58] Field of Search ............ 423/561, 565, 509; 204/192 N; 429/218; 427/38

[56] References Cited

U.S. PATENT DOCUMENTS

| 3,622,382 | 11/1971 | Brack et al. | 427/38 |
| 3,666,548 | 5/1972 | Brack et al. | 427/38 |
| 4,009,052 | 2/1977 | Whittingham | 429/218 |
| 4,016,389 | 4/1977 | White | 204/192 N |
| 4,040,917 | 8/1977 | Whittingham | 204/86 |
| 4,049,887 | 9/1977 | Whittingham | 429/218 |
| 4,084,046 | 4/1978 | Whittingham | 429/218 |
| 4,105,443 | 8/1978 | Dearnaley et al. | 427/38 |
| 4,126,732 | 11/1978 | Schoular et al. | 148/189 |
| 4,206,276 | 6/1980 | Basu et al. | 429/218 |
| 4,299,892 | 11/1981 | Dines et al. | 423/561 R |
| 4,338,190 | 7/1982 | Hanamura | 204/290 R |
| 4,405,695 | 9/1983 | Moshtev et al. | 429/218 |
| 4,433,305 | 2/1984 | Manty et al. | 427/38 |

FOREIGN PATENT DOCUMENTS

| 53-128727 | 11/1978 | Japan | 423/561 R |
| 1413813 | 11/1975 | United Kingdom | 204/192 N |

OTHER PUBLICATIONS

Murphy et al., "Vanadium Disulfide: Metal Substitution and Lithium Intercalation", *J. of Solid State Chemistry*, 29, 339–343, (1979).
Whittingham, "Chemistry of Intercalation Compounds: Metal Guests in Chalcogenide Hosts", *Prog. Solid State Chem.*, vol. 12, pp. 4–99, (1978).

*Primary Examiner*—Gary P. Straub
*Attorney, Agent, or Firm*—Brumbaugh, Graves, Donohue & Raymond

[57] ABSTRACT

Intercalatable layered or lamellar stable transition metal chalcogenides, such as $CrS_2$, usable as cathode active materials and intercalatable layered or lamellar stable alkali metal-transition metal chalcogenides, such as $LiCrS_2$, usable as cathode active materials as well as anode active materials are synthesized by ion implantation and annealing techniques.

9 Claims, No Drawings

SYNTHESIS OF INTERCALATABLE LAYERED STABLE TRANSITION METAL CHALCOGENIDES AND ALKALI METAL-TRANSITION METAL CHALCOGENIDES

The present invention relates to the synthesis of intercalatable layered or lamellar stable transition metal chalcogenides as well as the synthesis of intercalatable layered or lamellar stable alkali metal-transition metal chalcogenides.

Within the Group 4b to 6b transition elements of the Periodic Table of the Elements, chromium is the only metallic element that will not form a stable dichalcogenide using vapor transport, solid state heterogenous reactions and other similar well-known synthetic techniques. Murphy et al, *J. of Solid State Chemistry*, 29, 339–343 (1979), have noted that theoretically the EMFs of Li/metal dichalcogenide cells are expected to increase in the order Ti<V<Cr based on the oxidation potentials of respective $M_{ox}/M_{red}$ couples which in turn would increase the theoretical energy density. For example, the theoretical energy density of a $Li/TiS_2$ cell is equal to 480 w-hr/kg, 505 w-hr/kg for a $Li/VS_2$ cell and 550 w-hr/kg for a $Li/V_{0.25}Cr_{0.75}S_2$ cell [Whittingham, *Prog. Solid State Chem.*, Vol. 12, pp. 4–99 (1978)]. Noting the trend reported by Whittingham, the theoretical energy density of $Li/CrS_2$ cell should exceed 570 w-hr/kg if a stable form of the $CrS_2$ compound could be synthesized. Additionally, there is sufficient evidence in the literature to indicate that the amount of Li capable of intercalating into a stable $CrS_2$ would be 1-4 atoms (e.g., $Li_xCrS_2$ where x=1 to 4) which would yield higher percent Li utilization, high power capacity and operating current densities.

Furthermore, if a stable $CrS_2$ compound existed and was incorporated into a secondary battery for electrical vehicles or utility load leveling devices, these devices would be less massive, occupy less volume and be less costly than similar $Li/TiS_2$ systems. On a comparative energy density basis, a $Li/CrS_2$ secondary battery could reduce site facility costs of a utility load leveling system by at least 25%–30%, where site facility costs account for better than 75% of the cost of a utility load leveling secondary battery system. In addition, if the EMF of a $Li/CrS_2$ cell exceeds that of a $Li/TiS_2$ system, the current densities needed to operate an electrical vehicle could be reduced to safe limits for certain efficient solvent-electrolyte mixtures. Based on these comparisons, a $Li/CrS_2$ system would have major commercial advantages over a $Li/TiS_2$ secondary battery.

The objects of the present invention, therefore, are the synthesis of intercalatable layered stable transition metal chalcogenides, such as $CrS_2$, usable as cathode active materials and also the synthesis of intercalatable layered stable alkali metal-transition metal chalcogenides, such as $LiCrS_2$, usable as cathode active materials as well as anode active materials.

Accordingly, the present invention provides a process for the synthesis of intercalatable layered stable transition metal chalcogenides which comprises:

(a) forming a compound having the general formula $MX_n$ where M is a transition metal selected from the group consisting of Ti, V, Cr, Fe, Zr and Nb; X is sulfur; and n is 2–3; by the steps of:

(a₁) ion implanting sulfur at an implantation energy in the range of about 150–200 kiloelectron volts and at a saturation dosage of $1\times10^{12}$ to $1\times10^{19}$ sulfur atoms/cm² into a substrate of the transition metal; and (a₂) annealing the sulfur-implanted substrate under a vacuum of from about $1\times10^{-5}$ torr to about $1\times10^{-6}$ torr at a temperature of from about 100° C. to about 300° C. for from about 8 hours to about 48 hours.

Representative and preferred species of the transition metal M, the chalcogen X (sulfur) and the number n are given in the following tabulation:

| M  | X | n |
|----|---|---|
| Cr | S | 2 |
| Ti | S | 2 |
| Ti | S | 3 |

The invention further provides a related process involving two additional steps. This related process is a process for the synthesis of intercalatable layered stable alkali metal-transition metal chalcogenides which comprises:

(a) forming a compound having the general formula $A_m MX_n$ where A is an alkali metal selected from the group consisting of lithium, sodium and potassium; M is a transition metal selected from the group consisting of Ti, V, Cr, Fe, Zr and Nb; X is sulfur; m is 1–4; and n is 2–3; by the steps of:

(a₁) ion implanting sulfur at an implantation energy in the range of about 150–200 kiloelectron volts and at a saturation dosage of $1\times10^{12}$ to $1\times10^{19}$ sulfur atoms/cm² into a substrate of the transition metal;

(a₂) annealing the sulfur-implanted substrate under a vacuum of from about $1\times10^{-5}$ torr to about $1\times10^{-6}$ torr at a temperature of from about 100° C. to about 300° C. for from about 8 hours to about 48 hours;

(a₃) ion implanting the alkali metal at an implantation energy in the range of about 150–200 kiloelectron volts and at a saturation dosage of $1\times10^{12}$ to $1\times10^{19}$ alkali metal atoms/cm² into the annealed sulfur-implanted substrate; and (a₄) annealing the alkali metal-implanted substrate under a vacuum of from about $1\times10^{-5}$ torr to about $1\times10^{-6}$ torr at a temperature of from about 80° C. to about 150° C. for from about 8 hours to about 48 hours.

Representative and preferred species of the alkali metal A, the transition metal M, the chalcogen X (sulfur) and the numbers m and n are set forth in the following tabulation:

| A  | M  | X | m | n |
|----|----|---|---|---|
| Li | Cr | S | 1 | 2 |
| Li | Cr | S | 2 | 2 |
| Li | Ti | S | 1 | 2 |
| Li | Ti | S | 1 | 3 |
| Li | Ti | S | 2 | 3 |

The substrate of the transition metal can be in a variety of forms, such as a thin film, e.g., 1–10 μm thickness, or foam, mesh, fiber or whisker laminates of the transition metal or of another metal that has been bulk plated with the transition metal. Porous substrates generally have a porosity of from about 50% to about 97%. The substrate of the transition metal can serve as a current collector when the transition metal is a conductive metal.

Ion implantation in the above two processes can be achieved by using a conventional ion implantation apparatus wherein a source of the chalcogen (sulfur) or alkali metal to be implanted is first ionized and then accelerated in an electric field to implantation energies which usually lie in the range of about 150-200 kiloelectron volts (keV) in a moderately hard vacuum (r 1 m Pa). Prior to impact on the substrate surface target, a particular ion species is discriminated by a magnetic field accelermeter.

The ion implanted and annealed compounds of the general formula $MX_n$ on current collector substrates can be used as the cathode active materials for alkali metal nonaqueous intercalatable secondary batteries. The ion implanted and annealed compounds of the general formula $A_mMX_n$ on current collector substrates can be used not only as cathode active materials but also as anode active materials for alkali metal nonaqueous intercalatable secondary batteries. When these latter compounds are used as both the anode active material as well as the cathode active material, the anode active material would have a higher alkali metal content than the cathode active material. For example, the anode active material could be $Li_2CrS_2$ while the cathode active material could be $LiCrS_2$ or the anode active material could be $Li_2TiS_3$ while the cathode active material could be $LiTiS_3$. A typical useful electrolyte system in such secondary batteries could be a lithium perchlorate electrolyte and a dioxolane solvent.

The products of the present invention are not only useful as cathode active materials or as anode active materials for nonaqueous intercalatable secondary batteries, but are also useful as catalysts and as photoactive materials. They can also be employed in the production of fuel cells, photogalvanic devices and photovoltaic devices.

The processes and products of the present invention will be further illustrated by the following representative examples thereof.

EXAMPLES 1-6

Pretreatment for all Foam Substrates

Specimens of Ti, V, Cr, Fe, Zr and Nb foams were ultrasonically cleaned in a detergent/water mixture at 25° C. followed by a rinse and soak in acetone and cyclohexane. After solvent soak the specimens were vacuum dried at $1 \times 10^{-4}$ torr for 2 hours at 25° C.

Specimens of foams with the exception of these transition metals which hydride readily (e.g. Zr) were placed in a quartz reactor and evacuated to $1 \times 10^{-6}$ torr for 30 minutes. At the $1 \times 10^{-6}$ torr condition the reactor containing the foam was back filled with 90% He and 10% $H_2$ to 1 atmosphere. The reactor was sealed to the environment and heated at a rate of 10° C./minute to 500° C. The specimens were held isothermally for 24 hours at 500° C. and then slowly allowed to cool to 25° C. The foams were removed from the quartz reactor in a controlled argon environment.

Ion Implantation of Foam Substrates

Depth dose studies were completed to find appropriate doses and energies for saturation range and straggling values were calculated and sputter yields were found for chalcogen (sulfur) implanted. All foam specimens were placed in a specially designed holder to continuously cool the specimen during implantation. If the foams are not properly cooled, melting or degradation of the foam structure can occur. Prior to implantation it was found that inert gas sputtering of the surface was not necessary, because >800 Å of the foam fibril surfaces were removed by the impinging chalcogen (sulfur) ion stream prior to actual implant.

Dosages and implantation energy and depth are listed in Table 1 below.

TABLE 1

| ION IMPLANTATION: Doses, Energy and Depth Sulfur Beam Current = 1.2 mA | | | |
|---|---|---|---|
| Transition Metal | Dosage for Indicated Ions (ions/cm$^2$ × 10$^{18}$) S | Energy (KeV) S | Depth Å S |
| Ti | 2.5 | 200 | ~2200 |
| V | 2.5 | 200 | ~1750 |
| Cr | 2.4 | 200 | ~1400 |
| Fe | 2.4 | 200 | ~1400 |
| Zr | 1.2 | 150 | ~1400 |
| Nb | 1.2 | 150 | ~1300 |

The surfaces implanted with chalcogen (sulfur) were examined by scanning electron microscope (SEM) and by x-ray fluorescence analysis. X-ray analysis verified the following atom ratios on the implanted surfaces set forth in Table 2 below confirming atomic ratio values.

Table 2

Chalcogen (Sulfur) to Transition Metal Atom Ratio $S/Ti = 2.0:1.0$ ($TiS_{2.0}$)
$S/V = 2.0:1.0$ ($VS_{2.0}$)
$S/Cr = 1.9:1.0$ ($CrS_{1.9}$)
$S/Fe = 2.0:1.0$ ($FeS_{2.0}$)
$S/Zr = 2.0:1.0$ ($ZrS_{2.0}$)
$S/Nb = 2.0:1.0$ ($NbS_{2.0}$)

Specimen weights of the foams prior to implantation are given in Table 3 below.

Table 3

Specimen Weights (grams) of Foam Prior to Implantation (0.75" × 0.75" on edge by 0.25" thick)
Ti = 0.3513
V = 0.3735
Cr = 0.3814
Fe = 0.4096
Zr = 0.4795
Nb = 0.6814

All sulfur-implanted foams were annealed at $1 \times 10^{-6}$ torr for 32 hours at 300° C.

After implantation with sulfur at $TiS_2(Ti+S)$ foam was configured in a standard electrochemical cell configuration and tested for secondary battery characteristics. The condition for the cell evaluations and cell results are listed in Table 4 below.

TABLE 4

| Electrochemical Secondary Cell Characteristics of TiS$_2$(Ti + S) Implanted Specimens |
|---|
| Conditions and Figures of Merit |
| Cathode: TiS$_2$(Ti + S) |
| Anode: Li metal |
| Electrolyte and Solvent: 2.17 M LiAsF$_6$ + (70 v/o Dioxolane + 30 v/o dimetoxyethane) |
| Implant Depth: ~2200Å |
| Geometric Surface Area: 0.75 m$^2$ (3.63 cm$^2$) |
| TiS$_2$ Surface Volume: 4.84 × 10$^{-8}$ cm$^3$ |

TABLE 4-continued

Electrochemical Secondary Cell Characteristics of TiS$_2$(Ti + S) Implanted Specimens Discharge Current: 0.01 mA; Current Density:
2.8 × 10$^{-3}$ mA/cm$^2$
Charge Current: 0.005 mA; Current Density:
1.4 × 10$^{-3}$ mA/cm$^2$
Volumetric Current Density: Discharge - 2.07 × 10$^5$ mA/cm$^3$
Charge - 1.03 × 10$^5$ mA/cm$^3$
Voltage Limits: 3.0–1.6 V
Open Circuit Voltage: = 2.82 V
Internal Resistance: = 0.3 ohms
1st Cycle Energy Density: 487 whr/kg
Published Energy Density: = 480 whr/kg
Theoretical Energy Density: = 488 whr/kg at 2.16 V midrange
Midrange Voltage: 1.75 V
% Total Fade (1st → 2nd cycle) (Based on $t_D$) = 48.27%
% Energy Density Fade/Cycle
(3rd Cycle Reference) (%/Cycle)

at 5th cycle = 0.00
at 8th cycle = 0.00
at 15th cycle = 0.07
at 19th cycle = 0.00
at 26th cycle = 0.07
at 27th cycle = 0.04
at 30th cycle = 0.00

(A) Cyclic Cell Test Data

| Cycle No. | Discharge Time $t_D$ (seconds) | Charge Time $t_C$ (seconds) |
|---|---|---|
| 1 | 1392 | 528 |
| 2 | 720 | 1371 |
| 3 | 600 | 825 |
| 4 | 585 | 798 |
| 5 | 600 | 720 |
| 6 | 576 | 768 |
| 7 | 552 | 780 |
| 8 | 620 | 765 |
| 9 | 570 | 735 |
| 10 | 600 | 750 |
| 15 | 594 | 732 |
| 20 | 564 | 720 |
| 25 | 558 | 720 |
| 30 | 600 | 720 |
| 35 | 526 | 720 |

(B) % Energy Density Fade/Cycle (Referenced to Cycle No. 3)

| Cycle No. | $t_D$ Energy Fade/Cycle |
|---|---|
| 4 | 0.63 |
| 8 | none |
| 12 | 0.69 |
| 16 | 0.45 |
| 20 | 0.31 |
| 24 | 0.17 |
| 28 | 0.03 |
| 32 | 0.19 |
| 35 | 0.37 |

Average % Fade/Cycle for 35 cycles = 0.318%

EXAMPLE 7

Sulfur atoms were ion implanted at an implantation energy of about 200 kiloelectron volts and at a saturation dosage of 2.4×10$^{18}$ sulfur atoms/cm$^2$ into a chromium-plated 95% porous nickel foam.

The sulfur-implanted substrate was annealed under a vacuum of 1×10$^{-6}$ torr at a temperature of 125° C. for 16 hours.

Analysis of this product by SEM inspection showed it to be CrS$_{1.98}$ having a stable intercalatable layered structure.

EXAMPLE 8

A portion of the product of Example 7 was further treated as follows:

The annealed sulfur-implanted chromium-plated porous nickel foam was further ion implanted with lithium at an implantation energy of about 150–200 kiloelectron volts and at a saturation dosage of 2.6×10$^{18}$ lithium atoms/cm$^2$.

This lithium-implanted substrate was then annealed under a vacuum of 1×10$^{-6}$ torr at a temperature of 80° C. for 22 hours.

Analysis of this product by SEM inspection showed it to be Li$_{1.1}$CrS$_{1.98}$ which had a stable intercalatable layered structure.

What is claimed is:

1. A process for treating the surface of a transition metal substrate to form into the surface an intercalatable layered stable transition metal chalcogenide having the general formula MX$_n$ where M is a transition metal selected from the group consisting of Ti, V, Cr, Fe, Zr and Nb; X is sulfur; and n is 2–3; which comprises:
   ion implanting sulfur at an implantation energy in the range of about 150–200 kiloelectron volts and at a saturation dosage of about 10$^{18}$ sulfur atoms/cm$^2$ into the suface of the transition metal substrate to a depth of about 1300–2200Å; and
   annealing the sulfur-implanted substrate under a vacuum of from about 1×10$^{-5}$ torr to about 1×10$^{-6}$ torr at a temperature of from about 100° C. to about 300° C. for form about 8 hours to about 48 hours.

2. The process according to claim 1 wherein M is Ti, X is S and n is 2.

3. The process according to claim 1 wherein M is V, X is S and n is 2.

4. The process according to claim 1 wherein M is Cr, X is S and n is 2.

5. The process according to claim 1 wherein M is Fe, X is S and n is 2.

6. The process according to claim 1 wherein M is Zr, X is S and n is 2.

7. The process according to claim 1 wherein M is Nb, X is S and n is 2.

8. The process for treating the surface of a transition metal substrate to form into the surface an intercalatable layered stable alkali metal-transition metal chalcogenide having the general formula A$_m$MX$_n$ where A is an alkali metal selected from the group consisting of lithium, sodium and potassium; M is a transition metal selected from the group consisting of Ti, V, Cr, Fe, Zr and Nb; X is sulfur; m is 1–4; and n is 2–3; which comprises:
   ion implanting sulfur at an implantation energy in the range of about 150–200 kiloelectron volts and at a saturation dosage of about 10$^{18}$ sulfur atoms/cm$^2$ into the surface of the transition metal substrate to a depth of about 1300–2200Å;
   annealing the sulfur-implanted substrate under a vacuum of from about 1×10$^{-5}$ torr to about 1×10$^{-6}$ torr at a temperature of from about 100° C. to about 300° C. for from about 8 hours to about 48 hours;
   ion implanting the alkali metal at an implantation energy in the range of about 150–200 kiloelectron volts and at a saturation dosage of about 10$^{18}$ alkali metal atoms/cm$^2$ into the surface of the annealed sulfur-implanted substrate to a depth of about 1300–2200 Å; and
   annealing the alkali metal-implanted substrate under a vacuum of from about 1×10$^{-5}$ torr to about 1×10$^{-6}$ torr at a temperature of from about 80° C. to about 150° C. for from about 8 hours to about 48 hours.

9. The process according to claim 8 wherein A is Li, M is Cr, X is S, m is 1 and n is 2.

* * * * *